Nov. 9, 1943.                  C. P. XENIS ET AL                      2,333,758
              METHOD AND APPARATUS FOR INDICATING AVERAGE
                     RATE OF INTERMITTENT OPERATIONS
                         Filed Aug. 23, 1941            2 Sheets-Sheet 2
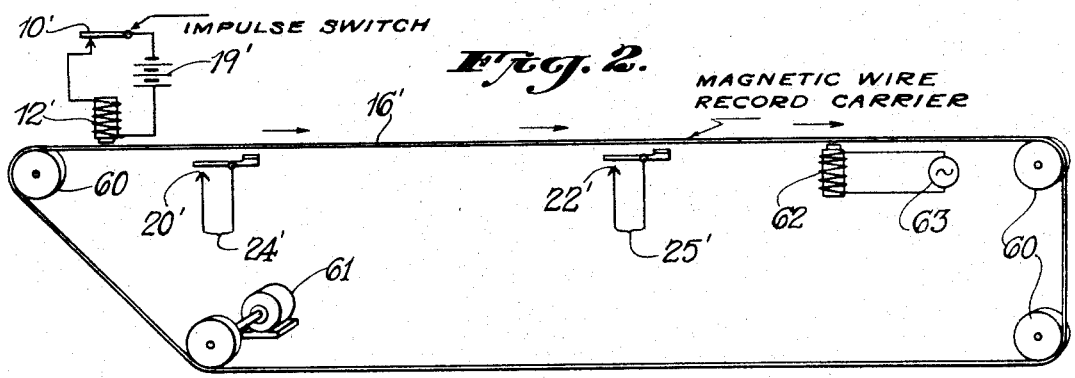
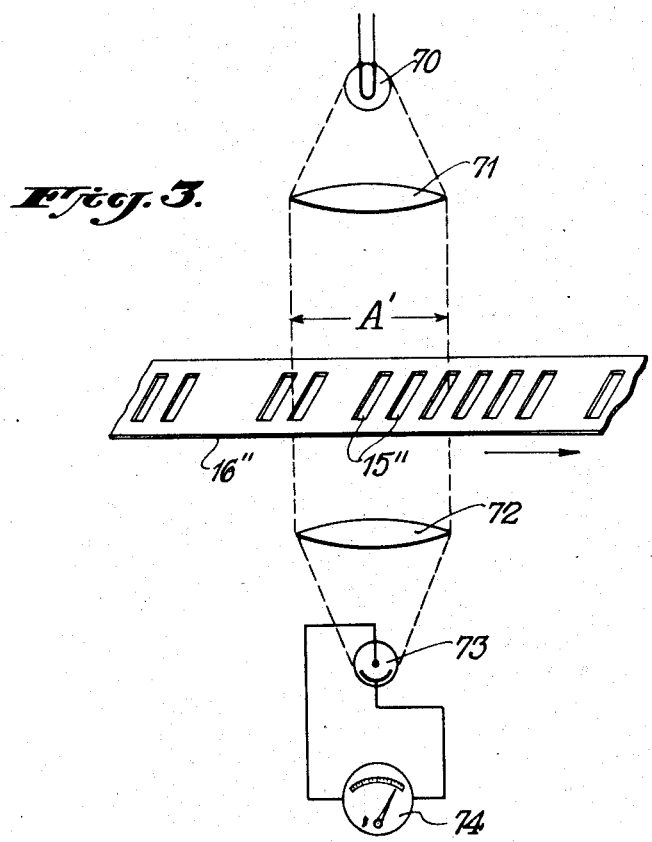

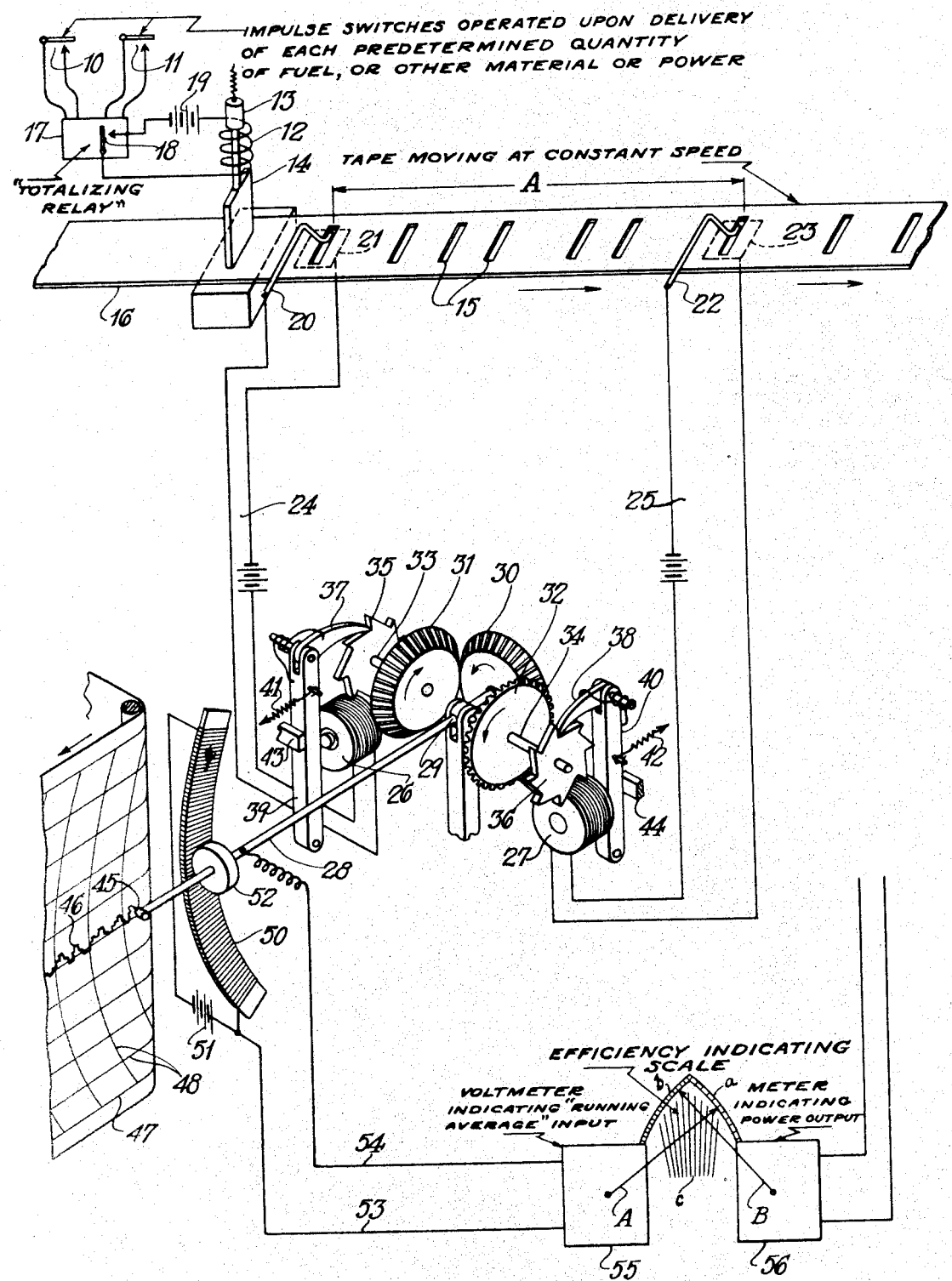

Patented Nov. 9, 1943

2,333,758

UNITED STATES PATENT OFFICE 2,333,758

METHOD AND APPARATUS FOR INDICATING AVERAGE RATE OF INTERMITTENT OPERATIONS

Constantine P. Xenis, Little Neck, Woodman Perine, Halesite, and Robert E. King, Brooklyn, N. Y., assignors to Consolidated Edison Company of New York, Inc., New York, N. Y., a corporation of New York Application August 23, 1941, Serial No. 408,040

7 Claims. (Cl. 234—5.8)

Various forms of metering or measuring devices and equipment are operable to produce or transmit impulses at a varying rate, with each impulse corresponding to a predetermined unit quantity measured. This invention relates to methods and apparatus for indicating or recording a "running average" of the rate of occurrence of such impulses, and also for utilizing such average indications for various purposes.

The invention is particularly adapted for example, for use in indicating the rate of fuel input for power generating equipment such as boilers, and for making such rate indications available in a form to be readily used with associated equipment for indicating or measuring the efficiency of the equipment. That is, boilers of many large power plants are supplied with coal by the use of coal-weighing scales of a type which will automatically weight out a predetermined amount of coal and then dump the same on to a stoker or grate, and repeate this operation at more or less irregular intervals. Because of this irregular nature of the fuel supply, it is difficult to measure or estimate at any given moment, or for any short time interval, the effective rate at which the fuel is being supplied. Hence, so far as we are aware, it has heretofore been impossible to immediately obtain at any moment, a measure of the rate of fuel input in such cases, as is necessary in order to be able to immediately compare the fuel input and power output to obtain running records of the efficiency of the power generating equipment. With the present invention, an impulse switch may be arranged at any suitable position upon or adjacent the coal-weighing scale bucket, whereby the switch will be actuated to transmit an impulse each time a predetermined amount of the coal is supplied to the boilers or the stokers therefor. The invention then provides methods and means for continuously indicating, or if desired for making a continuous graphic record of the average rate of occurrence of the last several impulses, thereby giving what will be herein termed as a "running average" of the rate of occurrence of the impulses, that is, the average number per unit of time, or if desired, its reciprocal, the average time spacing. This at the same time will provide what may be termed a "running average" of the rate of fuel supply. The method may be accomplished for example by recording the occurrence of the impulses in accordance with the spacings thereof, in succession on a moving record carrier, such as a film strip, a rotating record cylinder or disc, and by then variably controlling an indicating element, or graphic recording device, in accordance with the varying number of impulse recordations between two fixed points past which such succession of recordations is carried by the moving carrier. The indications given by such indicating element thus give a measure of the fuel input and may be constantly correlated with meter indications of the power output, to provide readings of the efficiency of the power generating equipment.

Various further and more specific objects, features and advantages will appear from the detailed description given below taken in connection with the accompanying drawings which form a part of this specification and illustrate merely by way of example preferred forms of the apparatus of the invention. The invention consists in such novel features, arrangements and combinations of parts as may be shown and described in connection with the apparatus herein disclosed, and also such novel methods and combinations of method steps as are disclosed and described herein.

In the drawings,

Fig. 1 diagrammatically illustrates a preferred embodiment of the invention with which the impulses are recorded in the form of punched impressions or holes on a moving strip type of record carrier, and with such record carrier arranged with electrically controlled means for indicating the desired running average;

Fig. 2 diagrammatically illustrates another embodiment of the invention wherein a magnetic form of record carrier is used; and Fig. 3 diagrammatically illustrates a further embodiment of the invention wherein the moving record carrier is associated with light-responsive electrical means for indicating the desired running average.

According to the arrangement of Fig. 1, the impulses for operating the apparatus may originate from one or more impulse switches as at 10, 11. Each of these switches may for example be arranged upon or adjacent an automatic fuel-weighing device so that each time the device is operated for supplying a predetermined amount of fuel, the switch will be closed for transmitting an impulse.

The impulses from the switches as at 10, 11 may be supplied to the circuit of a solenoid as at 12, whereby for example, an armature as at 13 will operate a punching device 14, each time an impulse occurs. The punching device is adapted to form suitable impressions, holes or other desired deformed record areas as at 15, through or upon a constantly moving record carrier 16, which may preferably take the form of a flexible film strip or tape. Thus a succession of impressions 15 will be formed on the record carrier 16 with spacings corresponding to the spacings of the impulses from the switches 10, 11. For example, the portion of the record marked "A" in Fig. 1 will normally bear several of the impressions or recordations and thus this portion of the record may correspond to a predetermined length of time, for example 10 minutes, or any other desired time period such as to normally include at least several impulses. It will be apparent that the total number of impressions within this length of tape will represent the total number of impulses which occurred during the time interval represented by this portion of the record, and it is the number of these spacings per unit of time that are averaged to give at any moment the "running average" indication desired.

Since the impulses from the switches 10, 11 may originate from the actuation of independently operating devices, it may sometimes happen that two or more impulses from a plurality of such switches will occur simultaneously, and accordingly in order to insure that the punch device will operate once for each and every impulse, it will be necessary to at least slightly separate any concurrent impulses before they are supplied to the circuit of solenoid 12. This may be readily accomplished by connecting the impulse switches 10, 11 to a relay arrangement available on the market and well known under the name "totalizing relay," as indicated at 17. This device is provided with a contact as at 18 which will normally operate promptly upon the occurrence of each impulse from switches 10, 11, but in case two (or more) impulses arrive in the device concurrently, then one or another will be delayed slightly to operate the switch 18 successively, once for each impulse received. As shown, the switch 18 may be connected through a suitable source of current such as a battery 19 in circuit with the solenoid 12.

Pairs of cooperating contacts as at 20, 21 and 22, 23 may be arranged respectively at predetermined fixed points, for example at the beginning and ending of the portion of the record path marked "A", and which are adapted to make contact for closing circuits 24, 25 respectively to energize electro-magnets 26, 27 respectively whenever one of the impulse recordations 15 passes either pair of contacts.

An indicating element as at 28 may be pivotally mounted as at 29 to swing for instance in a vertical plane. This indicating element may be operatively associated with a differential gearing assembly comprising for example a sun gear rotatably mounted on a continuation of the shaft of indicating element 28. Diametrically opposite portions of this sun gear mesh respectively with planet gears 31, 32 which may be affixed respectively upon rotatable shafts 33, 34 to which ratchets as at 35, 36 may also be affixed. These shafts may be carried in suitable bearings (not shown) to rotate with some friction. The ratchets are adapted to be rotated step-by-step as by spring-pressed pawls 37, 38 pivotally mounted as shown on armature levers 39, 40 cooperating with the electromagnets 26, 27. The members 39, 40 may normally be held as by springs 41, 42 in engagement with stops 43, 44, and when either of the magnets 26, 27 is energized by an electrical impulse, it will be apparent that pawl 37 or 38 will, in cooperation with its accompanying ratchet, serve to rotate either planet gear 31 or 32, through a slight angle equivalent to one ratchet step, in the directions indicated by the arrows on these gears.

It will now be apparent that whenever the record carrier advances one of the impulse recordations 15 into position to actuate contacts 20, 21, that the electromagnetically operated pawl and ratchet, and differential gearing arrangement will serve to rotate the sun gear 30 in a direction such that the pointer end of the indicating element 28 will be elevated through an angle corresponding to one impulse. However, if at the same time one of the impulse recordations is also actuating contacts 22, 23, then due to the arrangement of the differential gearing, the axis of the sun gear 30 will not be moved, but the gear will merely rotate about its axis and the position of the indicating element will not be changed. Again, if contacts 22, 23 are actuated by a recordation at a time when contacts 20, 21 are not being actuated, then the sun gear 30 will rotate and also cause the angular position of its axis to be changed so as to depress the pointer end of the indicating element 28 through an angle corresponding to one impulse.

Thus the above described mechanism and circuits serve in effect as means for counting or measuring, and indicating at all times, the total number of impulse recordations on that portion of the record carrier within the portion of its path marked A in Fig. 1. Thus if the length A has been so chosen in connection with the speed of movement of the record carrier that this length represents 10 minutes for example, then the indicator element will indicate at any time, the number of the impulses occurring within about 10 minutes previous to such time. And each time an impulse impression enters or leaves the portion of the record path marked A, the position of the indicator element will be shifted by a proper corresponding amount if the total number of record impressions within this portion of the record path is altered.

The indicator element 28 if desired may be provided with a suitable pen point or equivalent means as at 45 for drawing a graphic record as at 46 on a constantly advancing sheet record strip as at 47 of any suitable known type, preferably printed with suitable calibration lines as at 48.

In case the apparatus is used in conjunction with coal-weighing scales of a type which will weigh the coal in batches of 400 pounds, for example, then each of the impressions 15 on the record carrier 16 will correspond to 400 pounds of coal, and the chart 47 may be calibrated to give readings in terms of the average rate of coal supplied in pounds per 10 minutes, or per hour if desired. It will be apparent that the readings on the chart 47 will be proportional to the number of perforations within the interval represented by the distance A in Fig. 1, and each time the contacts 20, 21 are actuated, an amount corresponding to one impulse will be added to such reading, and each time the contacts 22, 23 are actuated, an amount corresponding to one impulse will be subtracted from such reading.

In case it is desired to transmit the indications to a remote point, the indicating element 28 may be arranged to operate a potentiometer comprising a resistance element as at 50 having its terminals connected to a suitable source of potential such as battery 51 as shown. The variable contact of this potentiometer may take the form for example of a conductive disc as at 52, rotatably mounted on element 28 so as to roll over the resistance element 50. Suitable connections as at 53, 54 for the varying voltage obtained from the potentiometer, may run to a volt meter as at 55 having an indicating pointer A cooperating with a dial $a$ calibrated for example to indicate the "running average" input in pounds per hour, of fuel to a boiler or group of boilers, or other power generating equipment. Or if the B. t. u. value per pound of the fuel is known, the scale $a$ may be calibrated in terms of input B. t. u.'s per hour. Then if it is desired to immediately correlate such indications with power output measurements in order to indicate the efficiency of the power generating equipment, this may readily be accomplished. That is, for example, a suitable meter 56 may be provided adjacent the volt meter 55 and with suitable connections to the output side of the power generating equipment, so that the indicator pointer B will indicate the output on scale $b$. In the copending applications of Constantine P. Xenis et. al., Ser. Nos. 392,908 and 392,909, reference to which is hereby made, arrangements are shown and described whereby a meter such as at 56 may be connected with suitable equipment so as to indicate either the output in B. t. u.'s per hour in the steam from a boiler or group of boilers, or if desired, the output in kilowatts generated by the turbo-generators operated by such boilers.

A scale $c$ may be formed between the scales $a$ and $b$, with so-called "iso-quotient" lines as explained in the above mentioned copending applications, so that from the points of intersection of the pointers A and B, one may read directly the quotients of the input and output indications at any time on scale $c$, or in other words read directly the efficiency of the power generating equipment, comprising the boilers alone, or the boilers with the steam-electric generator units. The particular arrangement of crossed pointer instruments 55, 56 for correlating the input and output indications is shown and described here merely by way of example, and various other forms of efficiency indicating meters may be substituted therefor.

The record may assume forms other than that having mechanically formed impressions as in Fig. 1. For example, with an arrangement as in Fig. 2, a magnetic wire or strip record carrier 16' may be used. With this arrangement impulses transmitted as from a switch 10' may be received by a magnet 12' positioned adjacent the magnetic carrier so that an area on the carrier is magnetized corresponding to each impulse. A succession of spaced magnetic recordations may thus be carried by the magnetic carrier past contacting devices as at 20' and 22' located at spaced points, and which will be actuated as each magnetic recordation passes, to close circuits as at 24' and 25' corresponding respectively in purpose to the above described circuits 24, 25. That is, the contacting devices 20', 22' may be accompanied by armatures as shown, which will be attracted to the magnetized areas on the carrier as the latter pass, and thereby cause the contacts to be momentarily closed for transmitting impulses to magnets, the same as at 26, 27 in Fig. 1. At a further point along its path of travel the magnetic carrier may be demagnetized by passing the same over a magnet 62 supplied with alternating current as from a source 63. If desired, the carrier may take the form of a continuous loop or band which may be passed over suitable pulleys as at 60, at least one of which may be driven as by a motor 61. With this arrangement using a continuous band type of carrier, it will be apparent that the same record carrier portions may be used again and again. Impulse switches and circuit means for transmitting and utilizing impulses from two or more sources may be used with Fig. 2, as in the case of Fig. 1. The remaining equipment to be used with the arrangement of Fig. 2 may be the same as for Fig. 1.

In Fig. 3 another arrangement is shown, using a record carrier 16" bearing a succession of impulse recordations 15" in the form of perforations, or otherwise made so as to modify the light-transmitting characteristics of the record strip. With this form, light as from a lamp 70 may be directed by a suitable lens 71 on to a predetermined desired length of the record carrier as at A' and thence through the areas 15". The variations in the amount of light thus passed through the record will be in direct proportion to the total area of all of the impulse record areas 15" within the section A' of the record present at any moment within the lighted area. The varying light as thus transmitted through the carrier may be directed as by a suitable lens 72 on to a light-responsive element 73, such as a photoelectric cell connected to a microammeter or other indicating device as at 74, which may include amplifying means if desired. The indicating device 74 will thus give indications varying in accordance with the total area of the impulse recordations between two fixed points represented by the limitations of the light beam through which the carrier travels. Thus, if the distance A' say, represents 10 minutes, the indications given by the device 74 will vary in accordance with the varying number of impulses per 10 minutes. Expressed in other terms, the indications given will be proportional to the number of impulses within any 10 minute interval. It will be understood that the impulse recordations on carrier 16" may be applied as by the punching means such as shown in Fig. 1 or otherwise. It will be further understood that the indicating instrument 74 if desired may be associated with recording means and/or potentiometer transmitting means, and efficiency indicating meters if desired, as with the case of the indicating element 28 of Fig. 1.

What is claimed as new and desired to be secured by Letters Patent is:

1. Method of measuring a running average rate of fuel input to power generating equipment for which the fuel is supplied in predetermined unit quantities at irregular intervals for the generation of a continuous but varying power output, and for utilizing such measurements to indicate the efficiency of said equipment, comprising: recording impulses spaced in accordance repectively with the spacings of such supplies of fuel, upon a constantly moving record carrier, variably controlling an indicating element in accordance with the varying number of impulse recordations occurring on said moving carrier per predetermined unit of its length at a fixed position subsequent to the point of recording, said unit of length being sufficient to normally bear at least several of the impulse recordations in succession, to thereby obtain a measure of the average rate of fuel input, continuously measuring the instantaneous rate of power output of the equipment, and continuously correlating such input and output measurements to obtain quotients thereof representative of said efficiency.

2. In combination with metering or measuring means of a type operating to produce impulses at a varying rate, each corresponding to a predetermined unit quantity measured, apparatus for indicating a running average of the varying rate of occurrence of said impulses, comprising: a constantly moving strip, a device operable by said impulses to form on said strip a succession of areas of modified light transmitting quality, and light-responsive means for effectively measuring said areas present at any moment on the portion of said moving strip between two predetermined points so spaced as to normally include therebetween at least several of said areas.

3. Method of indicating a running average of the rate of supply of fuel to combustion apparatus, where the fuel is supplied in predetermined unit quantities at irregular intervals from a plurality of sources and with a supply from one source sometimes occurring concurrently with a supply from another source, comprising: transmitting successions of impulses corresponding respectively to the timing of the unit supplies from the various sources, combining such successions of impulses into a single succession by somewhat spacing in the combined succession, such of the impulses as originated concurrently, then recording on a uniformly moving record carrier, the occurrence of the impulses of the combined succession, successively in accordance with spacings thereof, and variably controlling automatically, an indicating element by such recordations, in accordance at each moment with the varying total number of the impulses as previously recorded within a predetermined length of time sufficient to generally include at least several of the recorded impulses.

4. Method of indicating a running average of the rate of supply of fuel to combustion apparatus, where the fuel is supplied in predetermined unit quantities at irregular intervals from a plurality of sources and with a supply from one source sometimes occurring concurrently with a supply from another source, comprising: transmitting successions of impulses corresponding respectively to the timing of the unit supplies from the various sources, combining such successions of impulses into a single succession by somewhat spacing in the combined succession, such of the impulses as originated concurrently, effectively storing temporarily and electromagnetically the impulses of such combined succession to provide a temporary record of the timing thereof, and utilizing such record to electrically and variably control an indicating element in accordance at each moment with the number of the impulses previously recorded within a predetermined length of time generally sufficient to include at least several of the impulses.

5. Method of indicating a running average of the rate of occurrence of a succession of irregularly spaced impulses, which comprises, constantly subjecting a moving record carrier over the area thereof between two predetermined positions past which the carrier moves, to an energy transmitting medium, recording on said carrier prior to said positions, the occurrence of the impulses in succession and in accordance with the spacings thereof, said recording being effected by locally modifying the property of the carrier to transmit said medium, and measuring and indicating the variations in the total amount of such medium transmitted by said area of the carrier, to thereby indicate said running average.

6. Apparatus for indicating a running average of the rate of occurrence of a succession of irregularly spaced impulses, comprising a carrier, means for constantly moving same, means for transmitting energy to said carrier, said transmitting means being applied to said carrier over an area between two points in space and causing a definite and constantly progressing area on the carrier to be subjected to said energy, means for recording on said carrier by locally modifying the carrier, the occurrence of the impulses in succession and in accordance with the spacings thereof, and means for measuring and indicating the variations in the total amount of such energy controlled by said progressing area of the carrier, to thereby indicate said running average.

7. Apparatus for measuring a running average rate of fuel input to power generating equipment for which the fuel in the form of coal is supplied by stokers in predetermined unit quantities at irregular intervals for the generation of a continuous but varying power output, and for utilizing such measurements to indicate the efficiency of the equipment, comprising; a carrier, means for constantly moving said carrier, means for generating and recording impulses spaced substantially in accordance respectively with the spacings of such supplies of fuel, upon said moving carrier, an indicating element, means for variably controlling said indicating element in accordance with the varying number of impulse recordations occurring on said moving carrier per predetermined unit of its length between two fixed positions subsequent to the recording means, said unit of length being sufficient to normally bear at least several of the impulse recordations in succession, to thereby obtain varying indications representing the running average rate of fuel input, and means cooperating with said indicating element for continuously measuring the instantaneous rate of power output of the equipment and for directly giving running indications of the quotients of such input indications and said output measurements to thereby continuously indicate the efficiency of the equipment.

CONSTANTINE P. XENIS.
WOODMAN PERINE.
ROBERT E. KING.